Feb. 3, 1925.
W. A. LORENZ
1,525,190
APPARATUS FOR OBTAINING CHARGES OF MOLTEN GLASS
Filed April 4, 1922
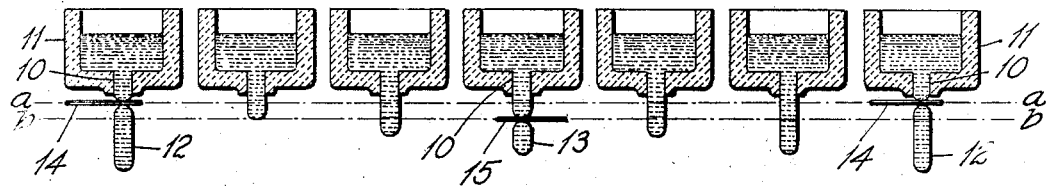
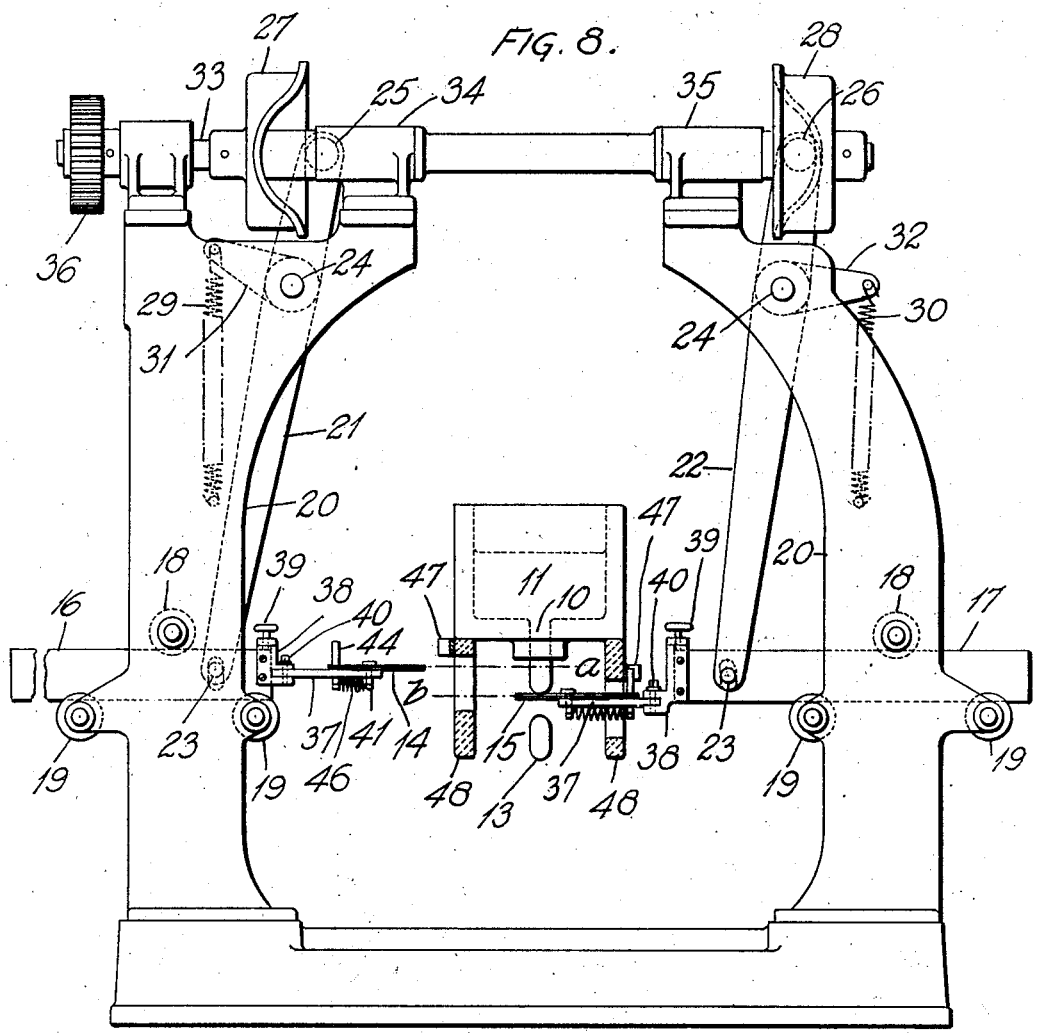
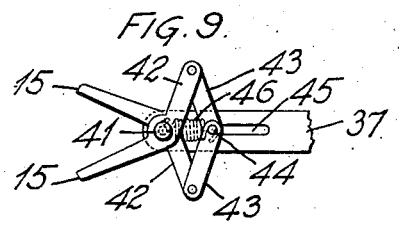
INVENTOR:
WILLIAM A. LORENZ
BY
ATTY.

Patented Feb. 3, 1925.

1,525,190

UNITED STATES PATENT OFFICE.

WILLIAM A. LORENZ, OF HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE.

APPARATUS FOR OBTAINING CHARGES OF MOLTEN GLASS.

Application filed April 4, 1922. Serial No. 549,449.

*To all whom it may concern:*

Be it known that I, WILLIAM A. LORENZ, a citizen of United States, residing at Hartford, in the county of Hartford and State of Connecticut, have invented new and useful Improvements in Apparatus for Obtaining Charges of Molten Glass, of which the following is a specification.

This invention relates to apparatus for separating molten glass into mold charges, its object being to provide suitable means for producing mold charges of different sizes or weights in a desired order of succession, including means for varying the relative proportions of the charges at will.

By suitably varying the size of the charges in a given series or cycle of severing operations, and repeating the series, a plurality of molds or shaping machines for making glassware of different sizes or weights may be regularly and continuously supplied with the required sizes of mold charges and in the required order from a single feeding machine.

In the present method, the different size mold charges are obtained from glass discharged and suspended from the outlet of a container, by separate severing devices operating alternately at different levels below the outlet, in any desired order.

All the charges of a given series may be of different sizes, or two or more of them may be of equal size.

The length and size of any mold charge obtained by the present method is proportionate to the distance of the plane in which it is severed from the plane in which the preceding charge was severed, assuming a given size outlet with a uniform rate of discharge and equal time periods of severing.

The amount of glass discharged during any cycle of operation of the machine, for producing a series of mold charges, is dependent on the rate of discharge of the glass, which may be varied by means of an adjustable regulating plug or valve in or adjacent the discharge outlet, or by varying the depth of glass and hence the hydrostatic head over the outlet, by means of an adjustable gate controlling the flow of glass to the container from a melting furnace or other source of supply, both of these methods being well known.

The charges, when severed, may be distributed and delivered to a set or series of the intended molds on one or more shaping machines, by a suitable delivering mechanism, such as that shown in U. S. Patent 1,373,202 of March 29, 1921.

In the drawing:

Figures 1 to 7 inclusive are a series of diagrammatic views illustrating the effects of severing the glass at different levels;

Fig. 8 is a front elevation, partly in section, of a machine embodying the invention; and Fig. 9 is a detailed plan view of one of the severing devices.

In Figures 1 to 7 inclusive the molten glass is shown discharging from the outlet 10 of a container 11, and the mold charges of different sizes, indicated at 12 and 13, are obtained by severing at the different planes $a$—$a$ and $b$—$b$ by means of the separate shears 14 and 15, operating in alternation or in any other order desired. The severing operations are shown as taking place in equal time periods in Figures 1, 4 and 7, the successive figures being spaced equal distances apart to represent equal time intervals, say, for example, periods of one second, so that the time between severing operations, in each case, will be three seconds. Assuming that the distance between the severing planes $a$—$a$ and $b$—$b$ is one inch, and further assuming that the glass flows uniformly at the rate of one inch per second, then the length of the glass discharged between severing periods of three seconds will be three inches. Starting with a severed charge at the lower level in Fig. 4, the length of the charge to be severed at the end of the next three second period in Fig. 7 will be four inches, because the plane $a$—$a$ is one inch above the plane $b$—$b$. At the end of the three second period between Figs. 1 and 4, the charge 13 will be only two inches long, because by severing at the lower level, one inch is subtracted from the three inches of glass discharged during the three second period. Stated in another way, of two mold charges severed at different planes, the longer mold charge is longer than the shorter charge by approximately twice the distance between the severing planes, still assuming a uniform rate of flow and equal time periods of severing. If severed at the same plane in equal time periods the charges will be equal in size.

In practice, the rapidity of discharge increases somewhat with the increasing weight of the discharged suspended mass, and allowance should be made for this variation by regulating the distance between the severing planes.

The separate severing devices operating at the different levels may be of any suitable design adapted for the purpose, but a preferred form of apparatus is shown in Figs. 8 and 9.

On opposite sides of the container 11 are the reciprocally mounted shear bars 16 and 17, positioned at different levels and guided between the upper and lower rollers 18 and 19 on the frame members 20. Reciprocation of the shear bars 16 and 17, carrying respectively the different sets of shears 14 and 15, is effected by the alternate movements of a pair of levers 21 and 22, pivotally connected to the shear bars at 23. The levers are pivotally mounted on studs 24 carried by the frame members 20 and are provided at their upper ends with cam rollers 25 and 26, held against the cams 27 and 28 by the springs 29 and 30, attached to the arms 31 and 32 of said levers. The shear cams 27 and 28 are fixed on a shaft 33 mounted in bearings 34 and 35, on the frame members 20, the shaft being provided with a gear 36 by which it is driven through connection with any suitable driving means. The cams 27 and 28 are shaped and set upon the shaft 33 in a manner to cause the separate sets of shears to alternately move into severing position at equal time periods.

The separate sets of shears 14 and 15 are mounted on holders 37 carried by brackets 38, suitably mounted for vertical adjustment on the ends of the shear bars, the adjustment being effected by turning a screw 39, which may be done while the machine is in operation, if desired. Lateral adjustment of the shears can be effected by loosening the clamp screws 40 passing through slots in the jaws of the bracket 38. More elaborate devices for mounting and adjusting the shear blades vertically and laterally may be provided if desired, such as that shown in U. S. Patent 1,405,936 of February 7, 1922. The shear mechanisms being the same, a description of one will suffice for both. The shear blades 14 are pivoted on a pin 41 carried by the holder 37, the blades having laterally extending arms 42 pivotally connected by a pair of links 43, the inner ends of which are connected and guided by a pin 44 sliding in a slot 45 in the holder 37. The blades 14 are held open, except during the severing operation, by a spring 46, the ends of which are connected to the lower ends of the pins 41 and 44 on the under side of the holder 37.

Upon inward movement of the shear bar 16, the upper portion of the pin 44 will strike an abutment 47 on the block 48, so that as the shear bar continues to move inwardly, the blades are automatically closed to sever a charge from the depending glass.

In severing the glass at the different levels by the separate sets of shears, one set may be made to sever, say for example, two charges of a given size in succession, and the other set severs a single charge, making three charges to complete the series. This can be done by substituting for the cams shown, other cams having their operating lobes arranged in the desired order, or gearing them or their shafts in the required ratio or order. By employing different cams of the proper proportions, severing may be effected in any order or sequence desired. In the specific embodiment shown, one of the cam members may have a single operating lobe and the other two operating lobes, said members being so disposed that the angles between the three lobes will be equal, or 120° in each case, so as to afford three severing operations at equal intervals for each revolution of the cam shaft.

A preferable way of adjusting the apparatus to obtain charges of the desired weights is first to adjust the shears, so that the distance between the severing planes will be approximately correct. Then start operation of the mechanism and regulate the rate of discharge of the glass until the combined weight of one series of mold charges equals the aggregate desired weight of the series. Then if necessary, vary the distance between the severing planes until the respective weights of the individual charges are correctly divided and apportioned.

The invention described and claimed herein may be modified in various ways to suit different conditions of service, without departing from the scope of the invention as defined by the appended claims.

I claim:

1. Apparatus for separating molten glass into mold charges, comprising a plurality of severing means mounted to operate in different planes, and means for periodically actuating said severing means to separate different size charges from suspended molten glass.

2. Apparatus for separating mold charges of different sizes from suspended molten glass comprising a plurality of severing means mounted to operate in different planes, and means for alternately actuating said severing means to periodically sever the glass at different levels.

3. Apparatus for separating molten glass into mold charges of different sizes from glass discharged from the outlet of a container, comprising a plurality or severing means mounted to operate at different levels below the outlet, means for alternately actuating said severing means, and means for adjusting the levels to vary the proportions of the charges.

4. Apparatus for separating molten glass into mold charges of different sizes from a column of glass, comprising a plurality of severing devices, mounted to operate at different levels and means for alternately actuating said devices to sever the different size charges from the column.

5. Apparatus for producing different size mold charges from suspended molten glass, comprising a plurality of severing devices mounted to operate in different planes, and means for actuating said devices to sever the glass at different levels.

6. Apparatus for producing different size mold charges from suspended molten glass, comprising a plurality of severing devices mounted to operate in different planes, means for actuating said devices, and means for varying the distance between the operating planes of said devices.

7. Apparatus for producing different size mold charges from suspended molten glass, comprising a plurality of severing devices mounted for movement in different planes, and common means for alternately moving said devices to severing position in the respective planes.

8. Apparatus for producing different size mold charges in succession from molten glass suspended from the outlet of a container, comprising a plurality of severing means mounted to operate at different distances from the outlet, and means for alternately actuating said severing means.

9. Apparatus for producing different size mold charges from a column of molten glass, comprising a plurality of shear mechanisms mounted to operate in different planes, and means for alternately actuating said mechanisms to sever the column at different planes.

10. Apparatus for producing different size mold charges from suspended molten glass, comprising a plurality of severing means mounted to operate in different planes, mechanism for periodically actuating each of the severing means, and means operatively connecting said actuating means for operating the same in alternation.

11. Apparatus for producing different size mold charges from suspended molten glass, comprising a plurality of severing devices mounted to operate in different planes for periodically severing the glass at different locations, an operating cam for each of said devices, and common means for actuating said cams.

Signed at Hartford, Connecticut, this 31st day of March, 1922.

WILLIAM A. LORENZ.